United States Patent
Kim et al.

(10) Patent No.: US 11,754,748 B2
(45) Date of Patent: Sep. 12, 2023

(54) TEMPERATURE PREDICTION SYSTEM

(71) Applicant: GWANGJU INSTITUTE OF SCIENCE AND TECHNOLOGY, Gwangju (KR)

(72) Inventors: Hong Kook Kim, Gwangju (KR); Seong Yeop Jeong, Gwangju (KR); In Young Park, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 56 days.

(21) Appl. No.: 17/371,763

(22) Filed: Jul. 9, 2021

(65) Prior Publication Data
US 2022/0146707 A1 May 12, 2022

(30) Foreign Application Priority Data
Nov. 12, 2020 (KR) .................. 10-2020-0150861

(51) Int. Cl.
*G01W 1/00* (2006.01)
*G06N 3/08* (2023.01)
*G06F 18/25* (2023.01)

(52) U.S. Cl.
CPC .............. *G01W 1/00* (2013.01); *G06F 18/25* (2023.01); *G06N 3/08* (2013.01)

(58) Field of Classification Search
CPC .......... G01W 1/00; G01W 1/10; G01W 1/02; G01W 2203/00; G06K 9/6288; G06K 9/6274; G06N 3/08; G06N 3/0481; G06N 3/0445; G06N 3/0454; G01K 2213/00
See application file for complete search history.

(56) References Cited

U.S. PATENT DOCUMENTS

| 10,996,374 B1 * | 5/2021 | Nazir | G06N 7/01 |
| 2018/0211156 A1 * | 7/2018 | Guan | G06N 3/044 |

FOREIGN PATENT DOCUMENTS

| KR | 20200052806 A | 5/2020 |

OTHER PUBLICATIONS

Cho et al. (Comparative Assessment of Various Machine Learning-Based Bias Correction Methods for Numerical Weather Prediction Model Forecasts of Extreme Air Temperatures in Urban Areas, Mar. 2020) (Year: 2020).*
Ho et al. (Visual Weather Temperature Prediction, 2018) (Year: 2018).*
Yi et al. (Development of an Urban High-Resolution Air Temperature Forecast System for Local Weather Information Services Based on Statistical Downscaling, Mar. 2018) (Year: 2018).*
Park et al. (Temperature Prediction Using the Missing Data Refinement Model Based on a Long Short-Term Memory Neural Network, Oct. 16, 2019) (Year: 2018).*

* cited by examiner

*Primary Examiner* — Mohammad K Islam
(74) *Attorney, Agent, or Firm* — LOZA & LOZA, LLP; Heidi Eisenhut

(57) ABSTRACT

A temperature prediction system may include a data input module configured to receive data related to climate, a prediction module having installed therein a trained model for predicting a temperature based on input data from the data input module, and an output module configured to output temperature information predicted by the prediction module.

13 Claims, 4 Drawing Sheets

FIG. 4

| Model | Time | Statistical lparameters | | | | | |
|---|---|---|---|---|---|---|---|
| | | RMSE | IOA | MBE | MNGE | MNB | R |
| Stacked bi-LSTM | 6 | 2.38 | 0.99 | 0.61 | 0.61 | 0.22 | 0.98 |
| | 12 | 2.70 | 0.98 | 0.32 | 0.70 | 0.11 | 0.97 |
| | 24 | 3.03 | 0.98 | 0.45 | 0.81 | 0.17 | 0.96 |
| | 72 | 3.83 | 0.96 | -0.60 | 1.02 | -0.20 | 0.93 |
| | 168 | 4.08 | 0.96 | -0.68 | 1.11 | -0.23 | 0.92 |
| | 336 | 4.42 | 0.95 | -0.92 | 1.19 | -0.31 | 0.91 |
| CNN using RDAPS | 6 | 2.17 | 0.99 | -0.02 | 0.37 | 0.00 | 0.98 |
| | 12 | 2.23 | 0.99 | -0.09 | 0.60 | -0.03 | 0.98 |
| | 24 | 2.47 | 0.99 | 0.04 | 0.65 | 0.02 | 0.97 |
| | 72 | 3.44 | 0.97 | 0.36 | 0.91 | 0.20 | 0.95 |
| | 168 | 3.72 | 0.97 | -0.43 | 1.02 | -0.14 | 0.93 |
| | 336 | 3.98 | 0.96 | -0.40 | 1.09 | -0.13 | 0.92 |
| Hybrid model | 6 | 1.93 | 0.99 | -0.06 | 0.47 | -0.02 | 0.98 |
| | 12 | 2.12 | 0.99 | 0.20 | 0.54 | 0.07 | 0.98 |
| | 24 | 2.34 | 0.99 | 0.42 | 0.60 | 0.15 | 0.98 |
| | 72 | 3.38 | 0.97 | 0.54 | 0.88 | 0.20 | 0.95 |
| | 168 | 3.71 | 0.97 | 0.21 | 0.99 | 0.08 | 0.93 |
| | 336 | 3.90 | 0.96 | 0.01 | 1.06 | 0.02 | 0.92 |

TEMPERATURE PREDICTION SYSTEM

This application claims priority under 35 U.S.C. 119 and 365 to Korean Patent Application No. 10-2020-0150861, filed on 12 Nov. 2020 in the Korean Intellectual Property Office, the disclosure of which is incorporated herein by reference.

BACKGROUND OF THE INVENTION

1. Field of the Invention

The present disclosure relates to a temperature prediction system for predicting a future atmospheric temperature.

2. Discussion of the Related Art

The Korea Meteorological Administration is providing general public with climate information such as temperature, humidity, wind direction, wind speed or precipitation measured at 510 observation stations as observed data. The Korea Meteorological Administration is providing regional forecast data using a model for providing weather information. As the model, the UK Meteorological Agency model (UM) has been used since 2010.

The UK Meteorological Agency model is a high-level prediction model. However, this is based on British data, not based on Korean climate data, and has large errors compared to prediction based on Korean data. This is because climate varies depending on various complex factors such as topography, space and time characteristics. The model is bound to have errors not only in Korea but also in countries other than the UK.

The inventor has proposed a refined weather prediction system by filling in missed observed data. Since weather is predicted using only observed data of a specific region in the above method, it is impossible to provide accurate weather information.

PRIOR ART LITERATURE

Patent Literature

Registered Patent 10-2172925, Method of Operating Deep Learning-based Temperature Prediction System

SUMMARY OF THE INVENTION

The present disclosure is proposed from the background described above, and an object of the present disclosure is to provide a weather prediction system suitable for the climate of Korea. Here, the climate of Korea may target the entire region of Korea as a single environment. Among the climates, a temperature may be the most important prediction information. Of course, when climate data of another country or region is input, prediction information of another country or region may be provided.

A temperature prediction system according to the present disclosure may include a data input module configured to receive data related to climate, a prediction module having installed therein a trained model for predicting a temperature based on input data from the data input module, and an output module configured to output temperature information predicted by the prediction module.

The input data may include at least one of temperature, humidity, wind speed, wind direction or precipitation.

The trained model may be trained using both observed data and a regional data assimilation prediction system (RDAPS) model. According to this model, more accurate temperature prediction is possible.

The observed data is learned by Bi-long short terms memory (Bi-LSTM) networks. Accordingly, it is possible to correctly learn observed data which is time-series information.

The RDAPS model may be learned by a convolution neural network (CNN). Accordingly, it is possible to more accurately learn spatial information. Temperature image information of the RDAPS model may be learned.

An artificial intelligence (AI) apparatus configured to provide the trained model may include a temporal feature value extractor configured to extract a temporal feature value from the observed data, and a spatial feature value extractor configured to extract a spatial feature value from the RDAPS model. Therefore, it is possible to independently learn a temporal feature value and a spatial feature value.

A merger configured to merge a vector of the spatial feature value and a vector of the temporal feature value may be included. Therefore, the temporal and spatial features may be used for temperature prediction together.

The spatial feature value may be merged by the merger, by extracting data having high correlation with the temporal feature value of the observed data through an attention mechanism and extracting data having high correlation with prediction target temperature information.

In a temperature prediction system according to another aspect of the present disclosure, the trained model may be provided by learning information on a regional data assimilation prediction system (RDAPS) model by a convolution neural network (CNN). In this case, it is possible to accurately predict a temperature by learning the RDAPS model which is spatial information using an artificial intelligence technique suitable for image learning.

The information on the RDAPS model may be temperature image information.

BRIEF DESCRIPTION OF THE DRAWINGS

FIG. 4 is a view illustrating an experimental result.

DETAILED DESCRIPTION OF THE PREFERRED EMBODIMENTS

Hereinafter, specific embodiments of the present disclosure will be described in detail with reference to the drawings. The spirit of the present disclosure is not limited to the embodiments described below, and those skilled in the art who understand the spirit of the present disclosure can easily propose other embodiments included within the scope of the same idea by adding, changing, deleting, and adding components. However, this will also be included within the scope of the present disclosure.

Deep learning is a field of machine learning that teaches computers how people think and attempts high-level abstractions from given data by combining several nonlinear transformations. Many researches into a method of representing various data in a form that can be understood by machine are being conducted. As a result, deep learning models are being developed. They have attracted a lot of attention and are replacing an existing signal processing technologies in many applications including voice recognition, image recognition, event detection and natural language processing.

A temperature prediction system according to an embodiment of the present disclosure may include an artificial intelligence-based temperature prediction model, to which actually observed data and a regional data assimilation prediction system (RDAPS) are input. As the observed data, 24-hour data, such as temperature, humidity, wind speed, wind direction and precipitation, may be input. The RDAPS model may include image information having at least temperature information.

In the temperature prediction system according to the embodiment of the present disclosure, when missed data is detected in the observed data, the missed data may be predicted according to a refinement function which is a portion of a proposed function. After all the missed data is refined, a temperature prediction model may be retrained using the refined data.

The temperature prediction system according to the embodiment of the present disclosure may predict a temperature in predetermined time units (1, 12 or 24 hours), and predict the temperature of a future date (after 7 days or after 14 days).

Figure 1:
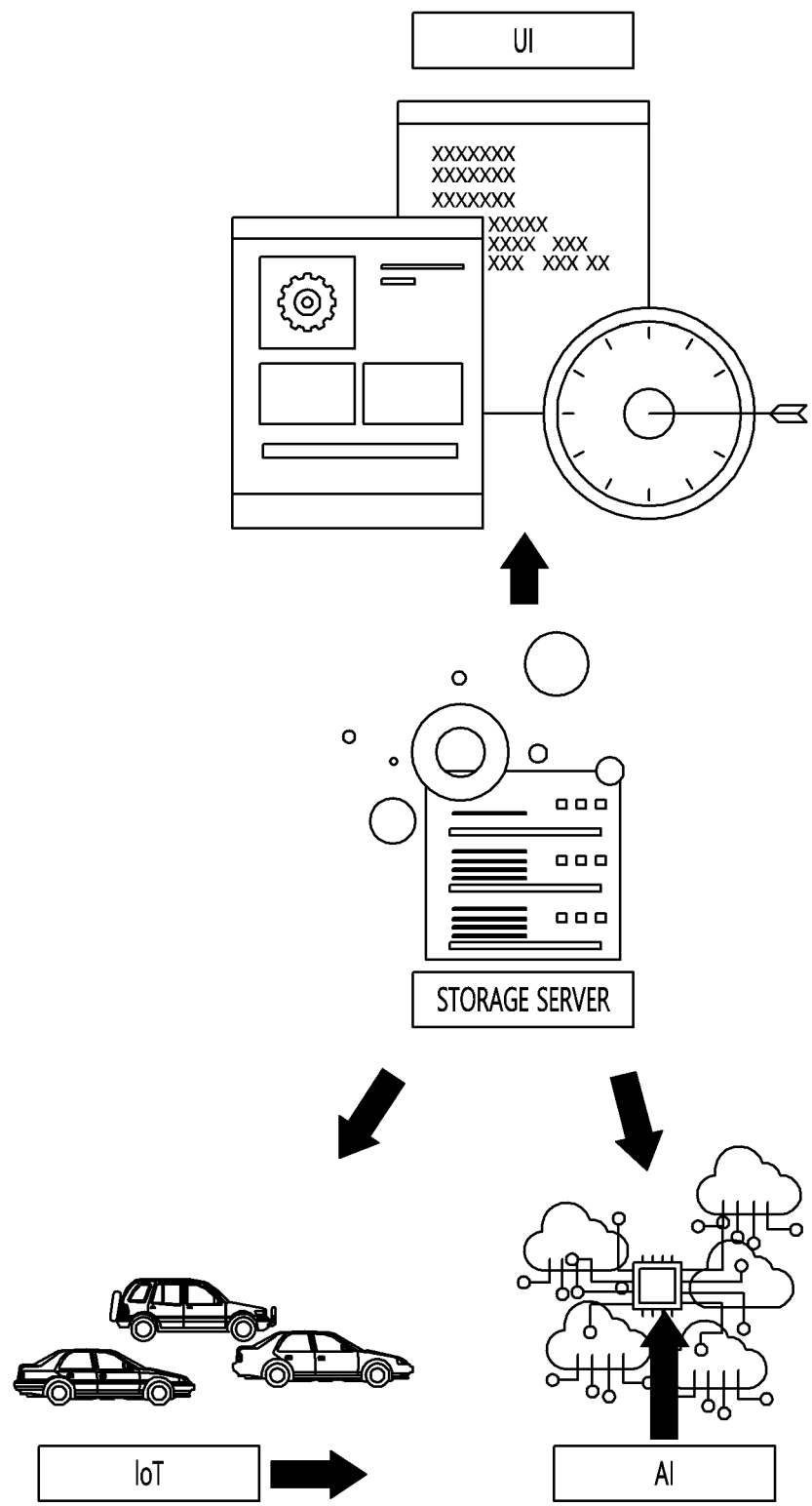
FIG. 1 is a view illustrating technical fields related to temperature prediction according to an embodiment.

FIG. 1 is a view illustrating various technical fields related to temperature prediction technology according to an embodiment.

The temperature prediction system of the present disclosure may be implemented through a storage server, a smart sensor-based Internet of things (IoT) (i.e., the interconnection via the internet of computing devices embedded in everyday objects, enabling them to send and receive data), and an artificial intelligence (AI) transmission information application user interface (UI). Specifically, the temperature prediction system of the present disclosure may be implemented using a time-series climate change information classification algorithm, data verification for visualization, a visualization algorithm, a prediction information utilization scenario and a real-time environment information provision user interface (UI).

The temperature prediction system of the present disclosure may be implemented through a temperature change information application monitoring integrated platform. Specifically, the temperature prediction system of the present disclosure may be implemented through a wireless communication network-based machine type communication (MTC) and real-time information transmission and reception between AI apparatuses, fault detection for incomplete data processing, real-time monitoring feedback protocol, monitoring service and application scenario. MTC denotes the broad area of wireless communication with sensors, actuators, physical objects and other devices not directly operated by humans. The MTC includes a computer-readable medium that can have stored thereon a program that when executed can cause a computer to perform a method. The method can include the functions performed by a data input module, prediction module, and output module. The computer-readable medium can be a non-transitory medium.

Figure 2:
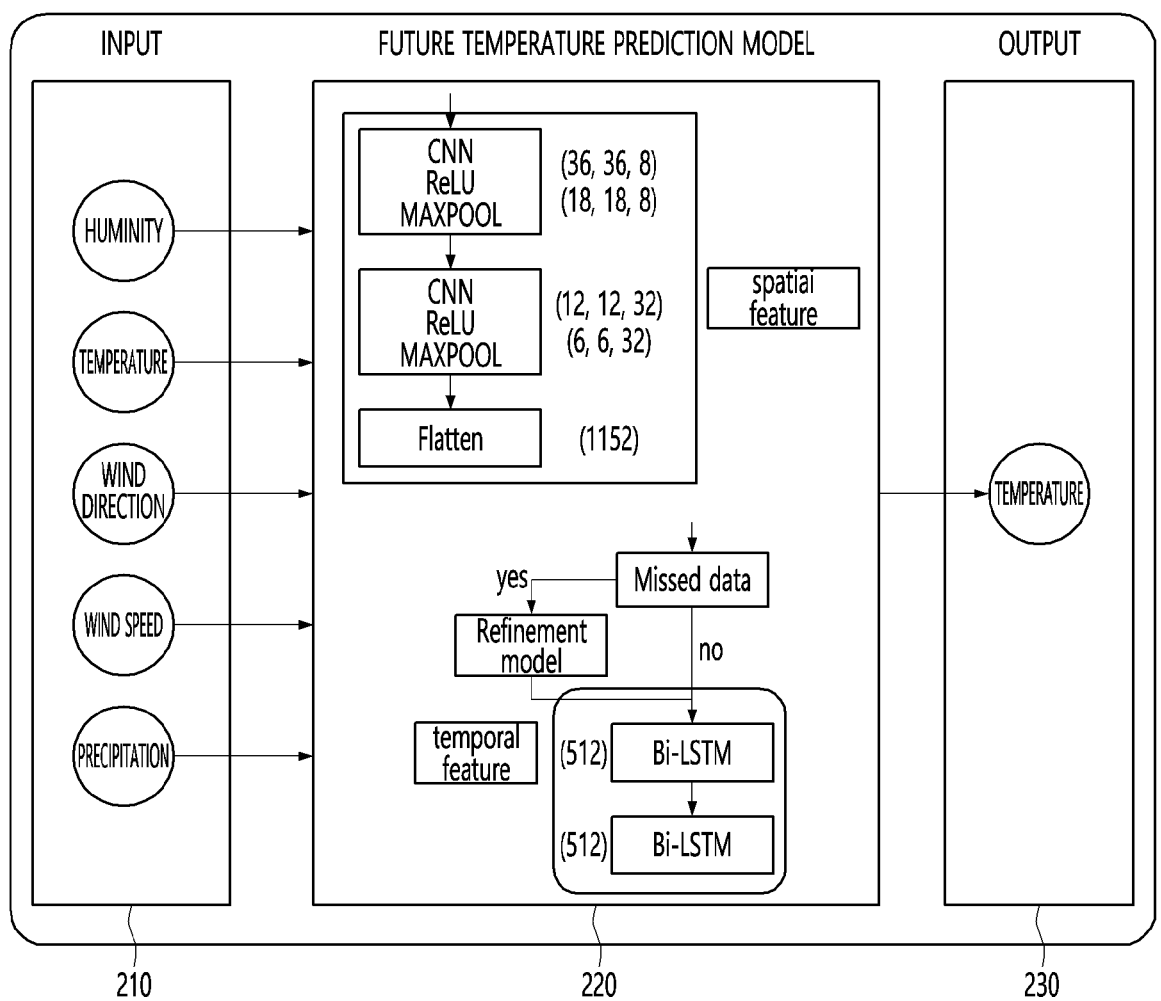
FIG. 2 is a view illustrating an embodiment of a temperature prediction system according to an embodiment.

FIG. 2 is a view illustrating an embodiment of a temperature prediction system according to an embodiment.

Referring to FIG. 2, the temperature prediction system 200 of the present disclosure may include a data input module 210, a future temperature prediction module 220 and a prediction result output module 230.

The data input module 210 provides input data to the prediction module 220. The input data may include at least one of temperature, humidity, wind speed, wind direction or precipitation. Of course, the input data may include the other information related to climate. The input data may include all temperature, humidity, wind speed, wind direction and precipitation.

The prediction module 220 may predict a temperature change based on data from the data input module 210, and provide a result of prediction to the prediction result output module 230.

In some embodiments, in the prediction module 220, a model trained for temperature prediction based on deep learning using a temperature information prediction function may be installed.

The trained model may be trained using a Bidirectional long short terms memory (Bi-LSTM) networks, a convolution neural network (CNN) and an attention mechanism.

The Bi-LSTM is applicable to learning of the observed data. The CNN is applicable to learning of the RDAPS model. Attention mechanism is utilized for extraction of similar features between observed data and RDAPS model The prediction result output module 230 outputs the result of prediction from the prediction module 220 in a preset manner.

Figure 3:
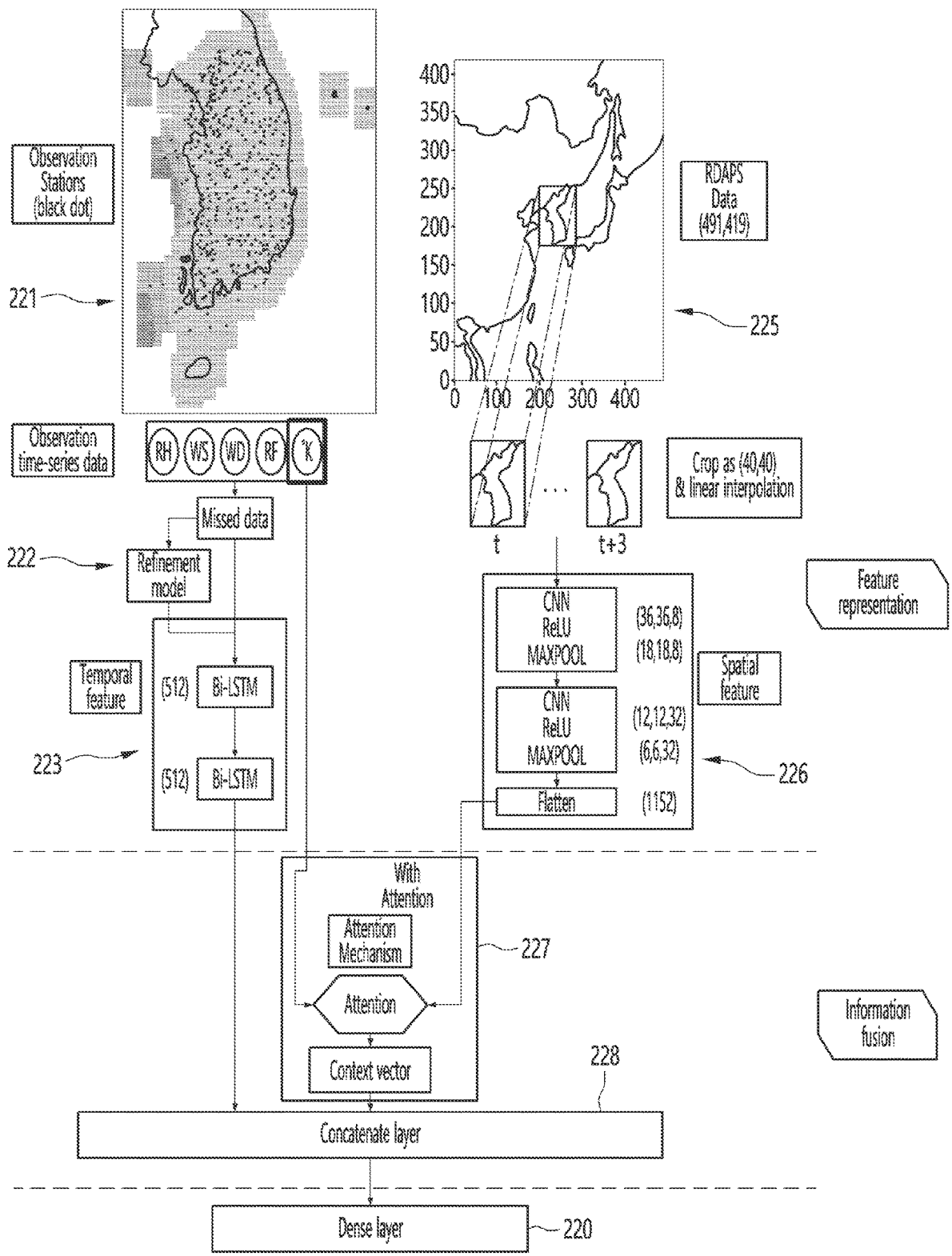
FIG. 3 is a view illustrating an AI apparatus for providing a trained model.

FIG. 3 is a view illustrating an AI apparatus for providing a trained model.

Referring to FIG. 3, learning of observed data 221 and learning of the RDAPS model 225 may be performed using different techniques. Learning of observed data 221 and learning of the RDAPS model 225 may be independently performed. Learning results may be merged later.

Learning of the observed data may be performed by refining the missed weather information, thereby increasing learning efficiency. The observed data may be learned using a Bi-LSTM technique. In order to increase learning efficiency of the observed data, a missed weather information refinement unit 222 for refining missed information in the observed data may be included.

The observed data may utilize the Bi-LSTM technique, which is capable of easily processing time-series information. A temporal feature value extractor 223 for extracting a temporal feature value by learning the observed data may be included. The observed data may include at least temperature, humidity, wind speed, wind direction and precipitation. The observed data may be provided by several hundreds of observation stations scattered in each region through Korea. The observed data may be data of observation stations in another country or region. Here, the region may be a state or a continent.

The RDAPS model may be expressed by image data. The image may include temperature information. The image data may be image data of the entire region of Korea. The image data may display temperature information by representing the same temperature in the same color. The data of the RDAPS model may be temperature image data. The image data may be image data of another country or region.

The RDAPS model may be learned using a CNN technique. Spatial feature values may be extracted using the CNN technique. The CNN technique may extract an important spatial feature value of the entire region of Korea. The CNN technique may be suitable for extraction of important feature values in image analysis. The CNN technique may extract an important spatial feature value of another country or an entire region.

The temperature of a specific region may be predicted using only the spatial feature value extracted by a spatial feature value extractor 226. Only a trained model for predicting the temperature of a specific region using the spatial feature value may be applied to the prediction model 220. Here, the trained model may be referred to as a first trained model. The first trained model is characterized in that learning is performed using the entire region of Korea as a learning model. In the first trained model, information on the entire region of Korea may be helpful to predict the temperature of the specific region. The first trained model may reflect common climate characteristics of Korea. The first trained model may reflect common climate characteristics of another country or region. Of course, the country or region may vary according to the learning information of the first trained model.

The spatial feature value may be more accurately modified using the observed data. This is because the observed data includes more accurate information.

Specifically, in the spatial feature value extracted by the spatial feature value extractor 226, only data similar to the temperature information of the observed data may be extracted using the temperature information of the observed data 221. A temperature extractor 227 may extract only most similar information from between a query (RDASP model) and a key (temperature information of the observed data). The temperature extractor may operate using the attention mechanism.

A temporal feature value vector extracted from the temporal feature value extractor 223 and a spatial feature value vector extracted by the spatial feature value extractor 226 may be merged by a merger 228. A trained model may be provided through the merger. This model may be referred to as a second trained model to be distinguished from the first trained model.

Like the first trained model, the second trained model may be trained using the entire region of Korea as a learning model, information on the entire region of Korea may be helpful to predict the temperature of a specific region, and the second trained model may reflect common climate characteristics of Korea. The second trained model may reflect the climate characteristics of another country or region. The second trained model may vary according to training data.

The following data was provided in order to provide the first and second trained models.

<Observed Data (Numerical Data Such as Temperature, Humidity, Wind Direction, Wind Speed or Precipitation)>

Data was collected from Mar. 16, 2011 to Dec. 31, 2015, training data was collected from Mar. 16, 2011 to Dec. 31, 2014, and test data was collected from Jan. 1, 2015 to Dec. 31, 2015.

<RDAPS Data (Image Data of Temperature)>

Data was collected from Mar. 16, 2011 to Dec. 31, 2015, training data was collected from Mar. 16, 2011 to Dec. 31, 2014, and test data was collected from Jan. 1, 2015 to Dec. 31, 2015.

<Comparison Model>

A model (Bi-LSTM) learned using only observed data, a model (CNN) learned using only RDPAS data, and a model (hybrid) learned using observed data and RDAPS data were compared.

<Prediction Period>

Short-term prediction: 6, 12 or 24 hours, long-term prediction: 72, 168 or 336 hours.

As performance of the temperature prediction system of an embodiment, root-mean-squared error (RMSE) between an actual temperature and a predicted temperature, index of agreement (IOA), mean bias error (MBE), mean normalized gross error (MNGE), mean normalized bias (MNB), and Pearson correlation (R) were compared.

The experimental result is shown in FIG. 4.

Referring to FIG. 4, it can be seen that the hybrid model (second trained model) has best performance. In addition, it can be seen that the model (first trained model) (CNN) learned using the RDASP model has a better result than the case of using only observed data.

More accurate temperature prediction is possible, by using not only observed data representing only regional information but also the RDASP model reflecting the climate characteristics of Korea or another country or region.

According to the present disclosure, more accurate temperature prediction is possible.

According to the present disclosure, it is possible to provide a prediction system suitable for the situation of Korea. In particular, it is possible to accurately predict a temperature. Of course, when climate data of another region is input, it is possible to predict the temperature of another country or region.

What is claimed is:

1. A temperature prediction system comprising:
a data input module configured to receive data related to climate;
a prediction module having installed therein a trained model for predicting a temperature based on input data from the data input module; and
an output module configured to output temperature information predicted by the prediction module,
wherein the input data comprises at least one of temperature, humidity, wind speed, wind direction or precipitation,
wherein the trained model is trained using both observed data and a regional data assimilation prediction system (RDAPS) model,
wherein the trained model is provided by an artificial intelligence apparatus, the artificial intelligence apparatus comprising:
a first feature value extractor configured to extract a first feature value from the observed data, the first feature value being a temporal feature value;
a second feature value extractor configured to extract a second feature value from the RDAPS model, the second feature value being a spatial feature value; and
a merger configured to merge the first feature value and the second feature value, the merger providing the trained model.

2. The temperature prediction system of claim 1, wherein the observed data is learned by Bi-long short terms memory (Bi-LSTM) networks.

3. The temperature prediction system of claim 1, wherein the RDAPS model is learned by a convolution neural network (CNN).

4. The temperature prediction system of claim 3, wherein the RDAPS model is learned using temperature image information.

5. The temperature prediction system of claim 1, wherein the merger merges a vector of the first feature value and a vector of the second feature value.

6. The temperature prediction system of claim 1, wherein the second feature value is merged by the merger, by extracting data similar to the temperature information using temperature information of the observed data as a key.

7. The temperature prediction system of claim 1, wherein the input data comprises at least temperature information.

8. The temperature prediction system of claim 7, wherein the input data comprises at least two of temperature, humidity, wind speed, wind direction and precipitation.

9. The temperature prediction system of claim 7, wherein the input data comprises all temperature, humidity, wind speed, wind direction and precipitation.

10. A temperature prediction system comprising:
a data input module configured to receive data related to climate;
a prediction module having installed therein a trained model for predicting a temperature based on input data from the data input module; and
an output module configured to output temperature information predicted by the prediction module,
wherein the input data comprises at least temperature information,
wherein the trained model is trained using both observed data of a plurality of observation stations and a regional data assimilation prediction system (RDAPS) model,
wherein the RDAPS model is learned using information representing a temperature,
wherein the trained model is provided by an artificial intelligence apparatus, the artificial intelligence apparatus comprising:
a first feature value extractor configured to extract a first feature value from the observed data, the first feature value being a temporal feature value;
a second feature value extractor configured to extract a second feature value from the RDAPS model, the second feature value being a spatial feature value; and
a merger configured to merge the first feature value and the second feature value, the merger providing the trained model.

11. The temperature prediction system of claim 10, wherein the observed data is learned by Bi-long short terms memory (Bi-LSTM) networks.

12. The temperature prediction system of claim 10, wherein the RDAPS model is learned by a convolution neural network (CNN).

13. The temperature prediction system of claim 10, wherein the RDAPS model is learned using temperature image information.

* * * * *